US008464013B2

(12) United States Patent
Chen

(10) Patent No.: US 8,464,013 B2
(45) Date of Patent: *Jun. 11, 2013

(54) APPARATUS AND METHOD FOR ON-DEMAND IN-MEMORY DATABASE MANAGEMENT PLATFORM

(75) Inventor: Tianlong Chen, Gaithersburg, MD (US)

(73) Assignee: Intelitrac Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,531

(22) Filed: Oct. 25, 2011

(65) Prior Publication Data
US 2012/0095959 A1 Apr. 19, 2012

Related U.S. Application Data

(62) Division of application No. 11/566,452, filed on Dec. 4, 2006, now Pat. No. 8,046,557.

(60) Provisional application No. 60/742,364, filed on Dec. 5, 2005.

(51) Int. Cl.
G06F 12/00 (2006.01)
G06F 13/00 (2006.01)
G06F 13/28 (2006.01)

(52) U.S. Cl.
USPC ........... 711/165; 711/161; 711/162; 709/238; 709/239; 709/242

(58) Field of Classification Search
None
See application file for complete search history.

(56) References Cited

U.S. PATENT DOCUMENTS

| 5,237,661 | A | 8/1993 | Kawamura et al. |
|---|---|---|---|
| 5,765,181 | A | 6/1998 | Oberlin et al. |
| 5,809,495 | A | 9/1998 | Loaiza |
| 5,913,219 | A | 6/1999 | Baek et al. |
| 5,914,727 | A | 6/1999 | Horan et al. |
| 6,105,024 | A | 8/2000 | Graefe et al. |
| 6,199,141 | B1 | 3/2001 | Weinreb et al. |
| 6,304,867 | B1 | 10/2001 | Schmidt |
| 6,766,424 | B1 | 7/2004 | Wilson |
| 6,779,095 | B2 | 8/2004 | Selkirk |
| 6,785,674 | B2 | 8/2004 | Vu |
| 6,912,641 | B2 | 6/2005 | Chen et al. |
| 7,043,623 | B2 | 5/2006 | Chen et al. |
| 7,184,577 | B2 | 2/2007 | Chen et al. |
| 7,185,165 | B2 | 2/2007 | Chen et al. |
| 7,187,787 | B2 | 3/2007 | Chen et al. |
| 2002/0156973 | A1 | 10/2002 | Ulrich et al. |
| 2004/0151018 | A1 | 8/2004 | Chen et al. |
| 2005/0187984 | A1 | 8/2005 | Chen et al. |
| 2006/0004975 | A1 | 1/2006 | Matheny |

OTHER PUBLICATIONS

TimesTen Performance Software White Paper, "Architected for Real-Time Data Management—Times Ten's Core In-Memory Database Technology," TimesTen Performance Software 2001, pp.
"The Magic garden Explained" by B. Goodheart and J. Cox (1994).

Primary Examiner — Yaima Campos
(74) Attorney, Agent, or Firm — 24IP Law Group; Timothy R. DeWitt

(57) ABSTRACT

A method and apparatus for constructing a memory-based database service platform, in which database can be on-loaded and off-loaded or unloaded as needed, and can reserve schedule and size of memory and other resources, including CPUs, network, backup, mirroring and recovery recourses. With the service platform, multiple different types of databases can be chosen by specifying data storage type and data operation interfaces, such as Relational Database (RDB), Biometric Database (BDB), Time Series Database (TDB), Data Driven Database (DDDB) and File-based Database (FDB) etc. Database types can be chosen either by user directly or by platform automatically or semi-automatically based on data types and data operation characteristics.

6 Claims, 9 Drawing Sheets

APPARATUS AND METHOD FOR ON-DEMAND IN-MEMORY DATABASE MANAGEMENT PLATFORM

CROSS-REFERENCE TO RELATED APPLICATIONS

The present application is a divisional application of U.S. Nonprovisional Patent Application Ser. No. 11/566,452 filed on Dec. 4, 2006 now U.S. Pat. No. 8,046,557, which claims the benefit of the filing date of U.S. Provisional Application Ser. No. 60/742,364 entitled "Apparatus and Method for On-Demand In-Memory Database Management System," and filed on Dec. 5, 2005

Other applications that may of relevance to the present application include the following:

Invariant Memory Page Pool and Implementation Thereof; U.S. Pat. No. 6,912,641, granted on Jun. 28, 2005; Inventors: Tianlong Chen, Yingbin Wang and Yinong Wei.

Memory-Resident Database Management System and Implementation Thereof; Ser. No. 10/347,678; Filed on Jan. 22, 2003; Inventors: Tianlong Chen, Jonathan Vu.

Distributed Memory Computing Environment and Implementation Thereof; application Ser. No. 10/347,677, Filed on Jan. 22, 2003; Inventors: Tianlong Chen, Jonathan Vu, Yingbin Wang.

Image Indexing Search and Implementation Thereof; U.S. Provisional Application Ser. No. 60/454,315 filed on Mar. 14, 2003; Inventors: Tianlong Chen, Yi Rui, Yingbin Wang, and Yinong Wei.

Apparatus and Method for Biometric Database Management System; application Ser. No. 11/064,266 filed on Feb. 22, 2005; Inventors: Yingbin Wang and Tianlong Chen.

Data-Driven Database Management System, Ser. No. 11/044,698 filed Jan. 27, 2005; Inventor: Tianlong Chen.

The entirety of each of the aforementioned patent applications is incorporated by reference herein.

STATEMENT REGARDING FEDERALLY SPONSORED RESEARCH OR DEVELOPMENT

Not applicable.

FIELD OF THE INVENTION

The present invention is related to on-demand in-memory database platform architecture and its applicable services and its implementation.

BACKGROUND OF THE INVENTION

In-memory database has its own characteristics that disk-based database does not have. A memory-based database is often much faster than a disk-based database in data retrieval and data processing; since memory-based database has all or most of data and data structure in memory and data operation and data storage are at the same level, it has more flexibility in manipulating data and data structures than disk-based database; such flexibility is greatly suitable for creating customer definable databases as disclosed in the Patent Application "Data-Driven Database Management System" filed by Tianlong Chen. Since data is already in the memory, most copying procedures in normal disk-based database are not required any more, removing a great deal of operation overheads.

Because of the flexibility provided by memory, it is easy to create a variety of different kinds of databases to handle different types of data with their distinguishing data operations. As examples, a biometric database as disclosed in aforementioned Patent Application "Apparatus and Method for Biometric Database Management System" handles biometric data and biometric identification and verification operations using proprietary or open standard interface such as BioAPI as query interface; a relational database handles structured data in table format using SQL as query language; in a more general sense, a file system (such as Network File System or NFS) is also one kind of "general-sense" database, and a variety of different file systems having different characteristics using different accessing protocols (such as SCSI). A disk-based relational database uses either a proprietary storage system (i.e. a proprietary file system) or a regular file system provided by the Operating System to store data. Therefore whether it is a regular-sense database or a general-sense database, they can all be abstracted as an abstract database comprising data storage and interfaces for data access, manipulation and other data operations.

Memory is more expensive than hard disk, however it is faster than hard disk and it is more flexible in data manipulation than hard disk; therefore a system with memory-based database is likely to be more expensive than that with a disk-based database. It is not cost-effective to load database all into memory for some business and applications.

Such positive and negative characteristics make it possible for a new kind of service architecture—on-demand database platform in which a database can be loaded into memory platform for fast data processing, and be off-loaded or unloaded when it is done. Many other services can be done due to the characteristics, including multiple different types of databases, and customizable databases into such on-demand service.

SUMMARY OF THE INVENTION

The present invention disclosed and claimed herein is a method and apparatus for constructing a memory-based database service platform, in which database can be on-loaded and off-loaded or unloaded as needed, and can reserve schedule and size of memory and other resources, including CPUs, network, backup, mirroring and recovery recourses.

In still another aspect of the disclosed embodiment of the service platform, a method and apparatus for constructing an on-demand memory-based database service platform, in which multiple different types of databases can be chosen by specifying data storage type and data operation interfaces, such as Relational Database (RDB), Biometric Database (BDB), Time Series Database (TDB), Data Driven Database (DDDB) and File-based Database (FDB) etc. And database types can be chosen either by user directly or by platform automatically or semi-automatically based on data types and data operation characteristics.

In still another aspect of the disclosed embodiment of the service platform, a method and apparatus for managing file-based data storage, database-based data storage or other kinds of data storage in a uniform way.

In still another aspect of the disclosed embodiment of the service platform, a method and apparatus for constructing a memory-based database service platform, in which CPU and memory can be reserved for databases and data operations; different CPUs can be linked to different data manipulation.

In still another aspect of the disclosed embodiment of the service platform, a method and apparatus to enable users to choose data operations in a distributed way in which data is manipulated in parallel at "local" service nodes and fuse the result at a "master" node by collecting the sub-results from "local" nodes. The "local" nodes and "master" nodes can be in the different physical servers or in the same physical server.

The present invention disclosed and claimed herein also includes a method for dynamically generating duplicate memory blocks to duplicate query-intensive memory blocks for dividing and redirecting heavy traffic or for other purpose; the duplicated block can be partial or whole block of the source block. After using, such duplicated memory blocks can be dismissed.

The present invention disclosed and claimed herein also includes a method for registering and tracking information of related "neighbor" blocks of a block for possible faster access to those neighbor blocks. A first block is a neighbor block of a second block if the first block at least contains an address pointer that points to the second block, or if the first block has any (user-defined) "relationship" with the second block. Remote "neighbor" blocks can be pre-fetched (or pre-cached) to a local server for faster access.

The present invention further discloses and claims herein a block-oriented memory-based database system in which "neighborhood" information is tracked and used for better data pre-fetching, data loading and other data operations; and duplicated blocks are used for load balancing and access traffic redirection.

The present invention disclosed and claimed herein also includes a method for statically or dynamically configuring destination of a memory block by changing the information of an entry in the Memory Block Server ID Lookup Table or an entry in the Memory Block ID Lookup Table. Through such change, a memory location represented by a DMCE Virtual Address (which was disclosed in the Patent Application of "Distributed Memory Computing Environment and Implementation Thereof" by Tianlong Chen et al.) can be dynamically pointed to one or multiple addresses that are different from the originally pointed address.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

BRIEF DESCRIPTION OF THE DRAWINGS

For a more complete understanding of the present invention and the advantages thereof, reference is now made to the following description and the accompanying drawings, in which.

DESCRIPTION OF THE PREFERRED EMBODIMENT

Unless specifically mentioned, a memory can be either volatile or non-volatile.

Figure 1:
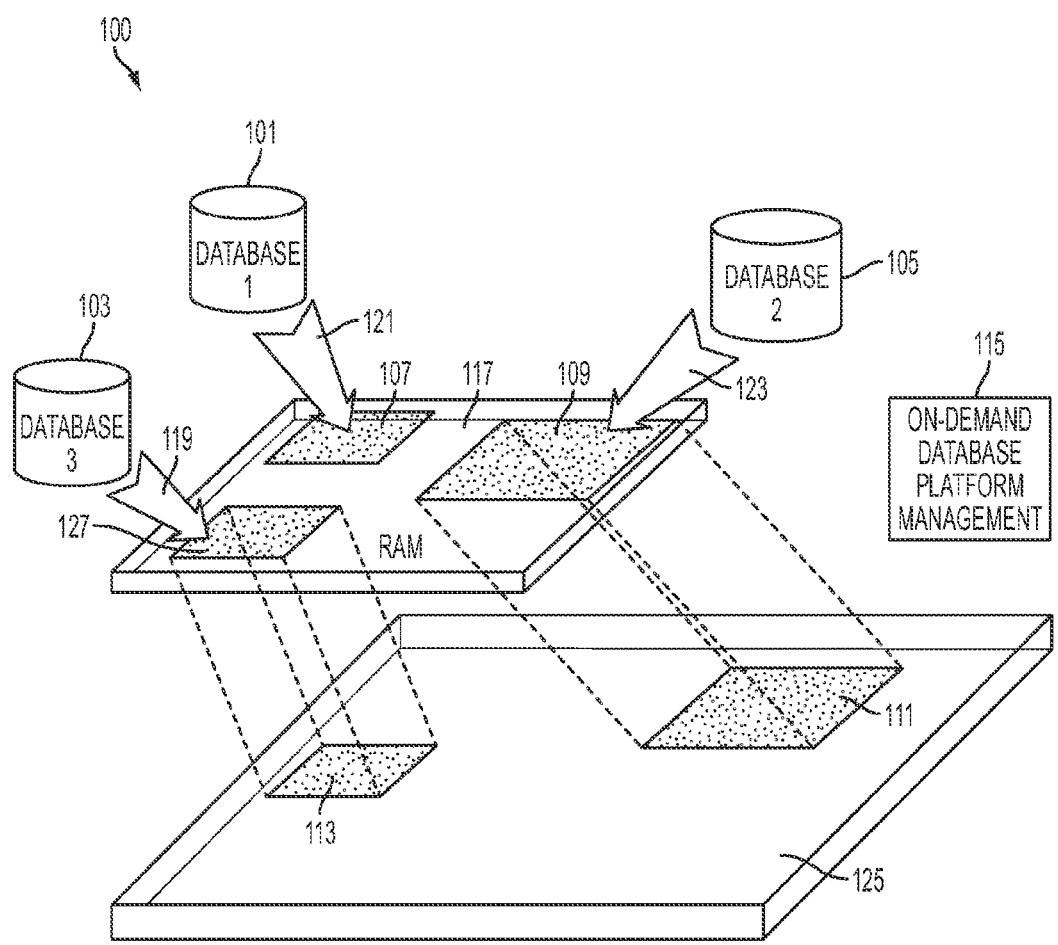
FIG. 1 illustrates a conceptual block diagram of an on-demand memory database service platform, in the illustrated sample scenario more than one separated databases are loaded into memory platform as needed. It is configurable that the databases that are loaded into memory can have backup and recovery copies.

FIG. 1 illustrates a conceptual block diagram of basic on-demand memory database service platform with memory (RAM) 117 managed by "On-demand Database Platform Management" 115. "General-sense" databases 101, 103, and 105 are loaded 121, 119, 123 into memory 117 as memory-based database functional blocks 107, 127, 109 ready for their respective data operations from different or same users. Among those loaded databases 107, 127, and 109, 127 and 109 have backup option enabled to have backup 113 and 111 into a backup/recovery system 125 which may be another memory-based system or a non-volatile backup system. Reference to the Patent "Invariant Memory Page Pool and Implementation Thereof" for such backup and recovery system.

Figure 2:
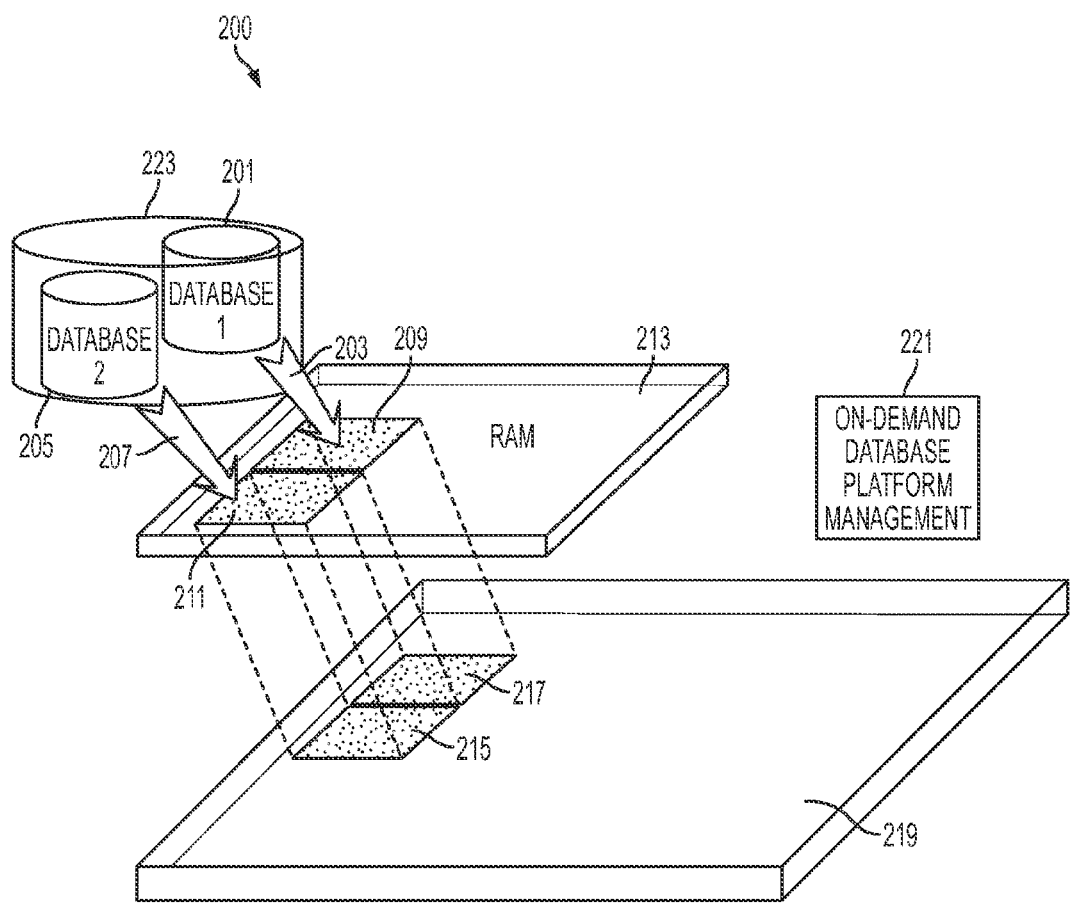
FIG. 2 illustrates a conceptual block diagram of an on-demand memory database service platform, in this illustrated sample scenario two different parts of a database are loaded into memory platform as needed.

FIG. 2 illustrates a conceptual block diagram of another possible operation scenario of the on-demand memory database service platform in which two database functional blocks 201 and 205 of a same database 223 are loaded 203, 207 into memory (RAM) 213 as memory-based databases 209 and 211 respectively, and both 209 and 211 having backup and recovery option enabled 215 and 217.

Figure 3:
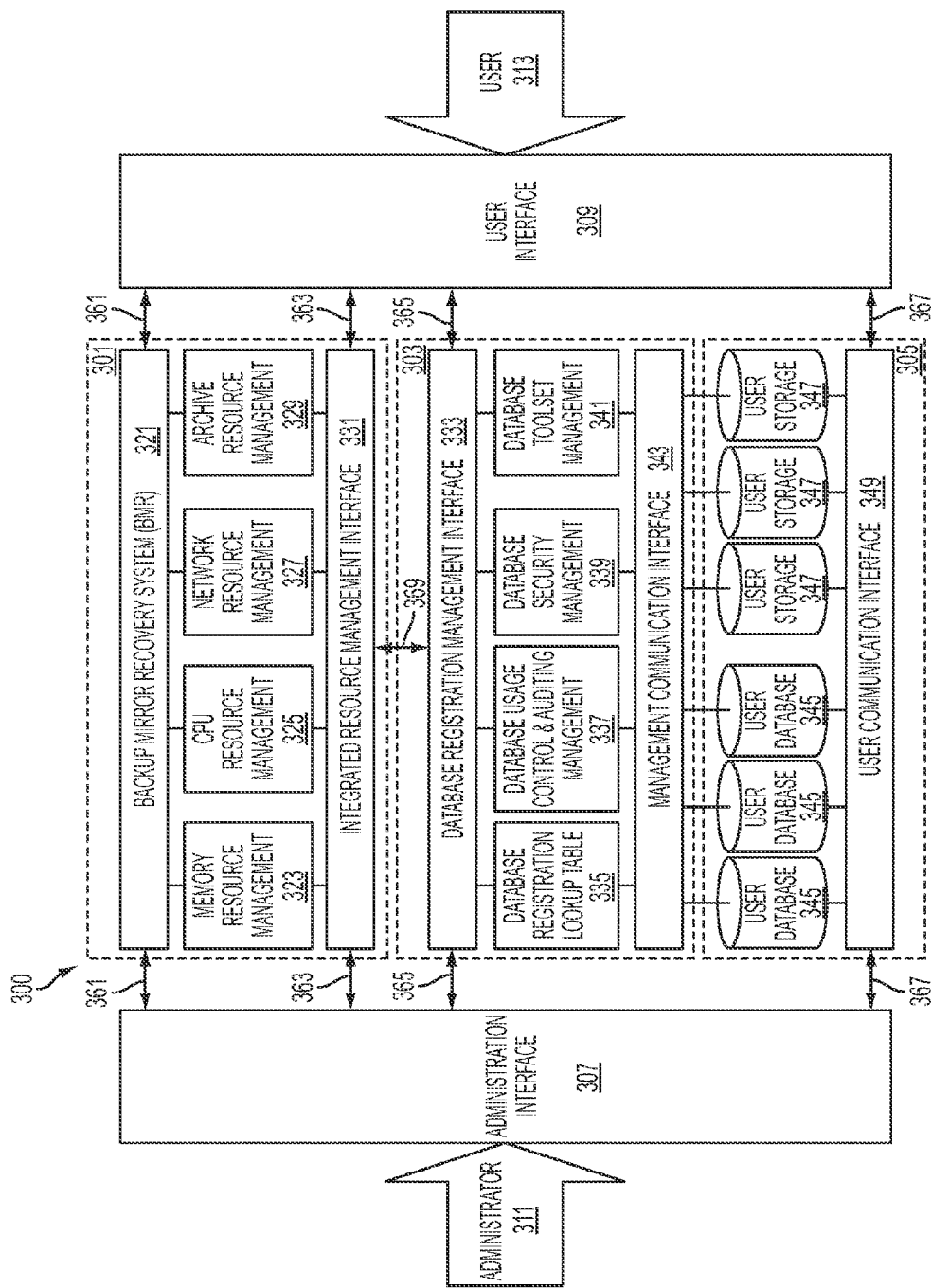
FIG. 3 illustrates a conceptual block diagram of an on-demand memory database service platform.

FIG. 3 illustrates a functional block diagram of an on-demand memory database service platform, including four major functional blocks: (1) System Resource Management 301 managing system resources such as memory 323, CPU 325, network 327, archival (hard disk, storage) 329, and other related resources; (2) Database Administration Management 303 managing database registration 335, database usage and audit control 337, security 339 and database toolset 341, and other database management functionality; (3) Database Layer Management directly managing databases 345, and other general-sensed databases 347; (4) Administration 307 and User Interface 309.

Still referring to FIG. 3, the System Resource Management 301 at least further includes managing resource availability, allocation, reservation, scheduling and automated or user-defined resource actions of memory, CPU, network (port, bandwidth, etc.), archival and etc., and also including virtual memory mapping, memory traffic and network balancing, backup, recovery and mirror functionality. An interface layer 331 is provided to Administration 307 or User 309 to control or query various resources, another interface layer 321 is provided to Administration 307 and User 309 to control or query the backup, recovery and mirror functionality.

Still referring to FIG. 3, the Database Administration Management 303 at least further includes 335 database registration, database type selections including general data type, data operation types, data query language that defines the database available operations; including database usage and audit tracking 337 it so desired, database security configuration 339 of who can access what data at what time with what kinds of operations, etc.; including database toolsets 341 that can be used by user for higher level integrated data manipulation. The Database Administration Management 303 can directly access the resource management functionality 301 through the interface layer 331, and it also provides an interface 333 for Administration 307 and User 309 to access, and an interface layer 343 to handle and manage the databases 345 and 347.

Still referring to FIG. 3, a User Communication Interface layer 349 is provided for Administration 307 and User 309 for access and direct manipulation of databases 345 and 347. This layer can be transparent or void in different data operation scenarios.

Figure 4:
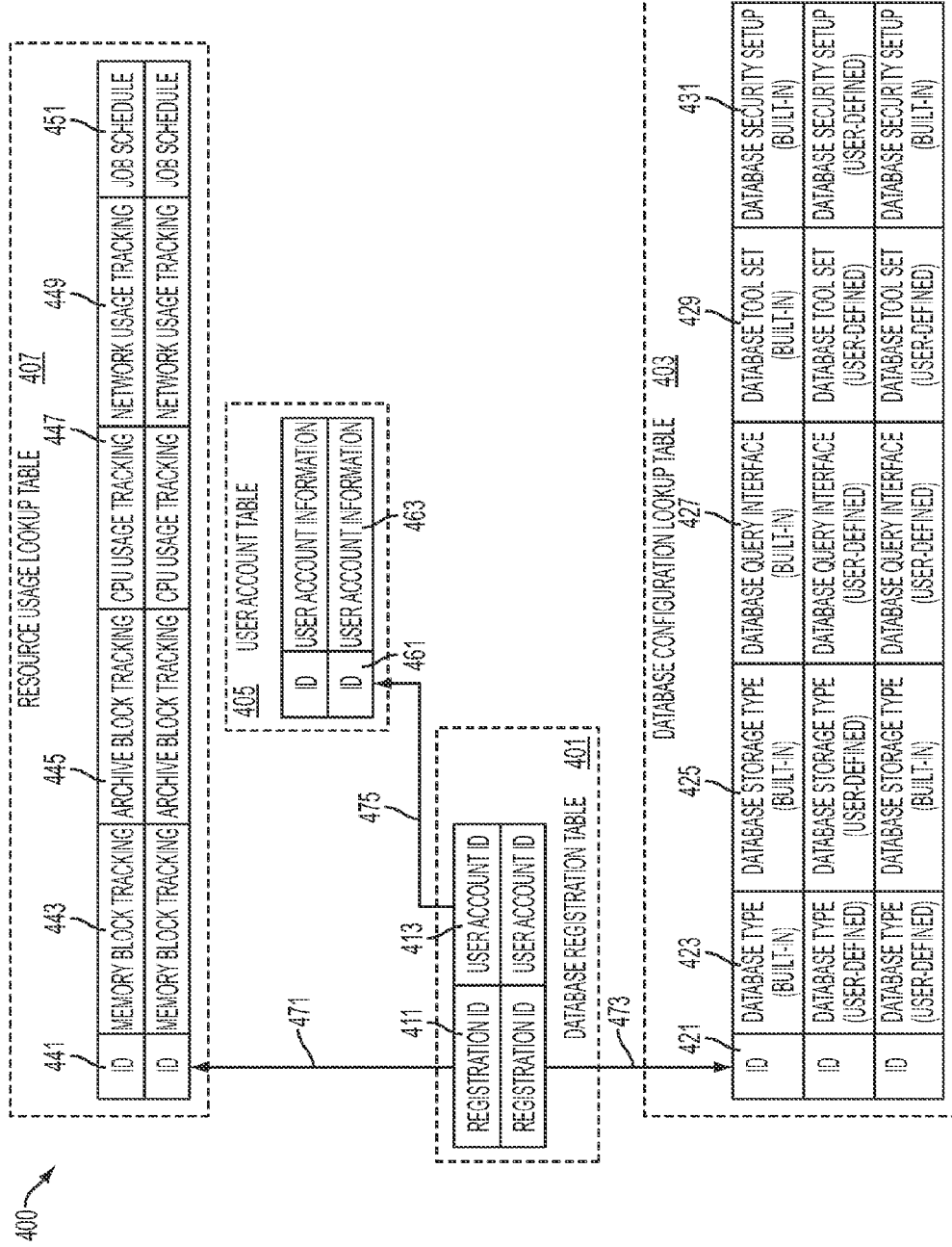
FIG. 4 illustrates a set of lookup tables in the memory database service platform for managing and manipulating on-demand loaded databases, including account tracking, resource usage, and database types and configuration information.

FIG. 4 illustrates an exemplary embodiment in which several Lookup Tables in the Database Administration Management (303 in FIG. 3) tracking database registration 401, user account information 405, database configuration 403, and resource usage 407. As illustrated in the Database Configuration Lookup Table 403, user can choose built-in or user-defined database types 423 (e.g. standard SQL based relational database, or BioAPI as query language based biometric database as depicted in the Patent Application of "Apparatus and Method for Biometric Database Management System" by Yingbin Wang et al.), storage type 425 (e.g. tree, hash, file-based, block-based, array, etc.; the storage includes the indexation data storage), query interface 427 (such as SQL, direct API, file access protocol, embedded function call, etc.), toolset 429 (e.g. integrated higher level analysis tool package, an example of such package is a Customer Relationship Management (CRM) software package), security setup 431 (e.g. who can access what kinds of data at what time with what kind of actions, role or rule-based security access control, etc.).

Figure 5:
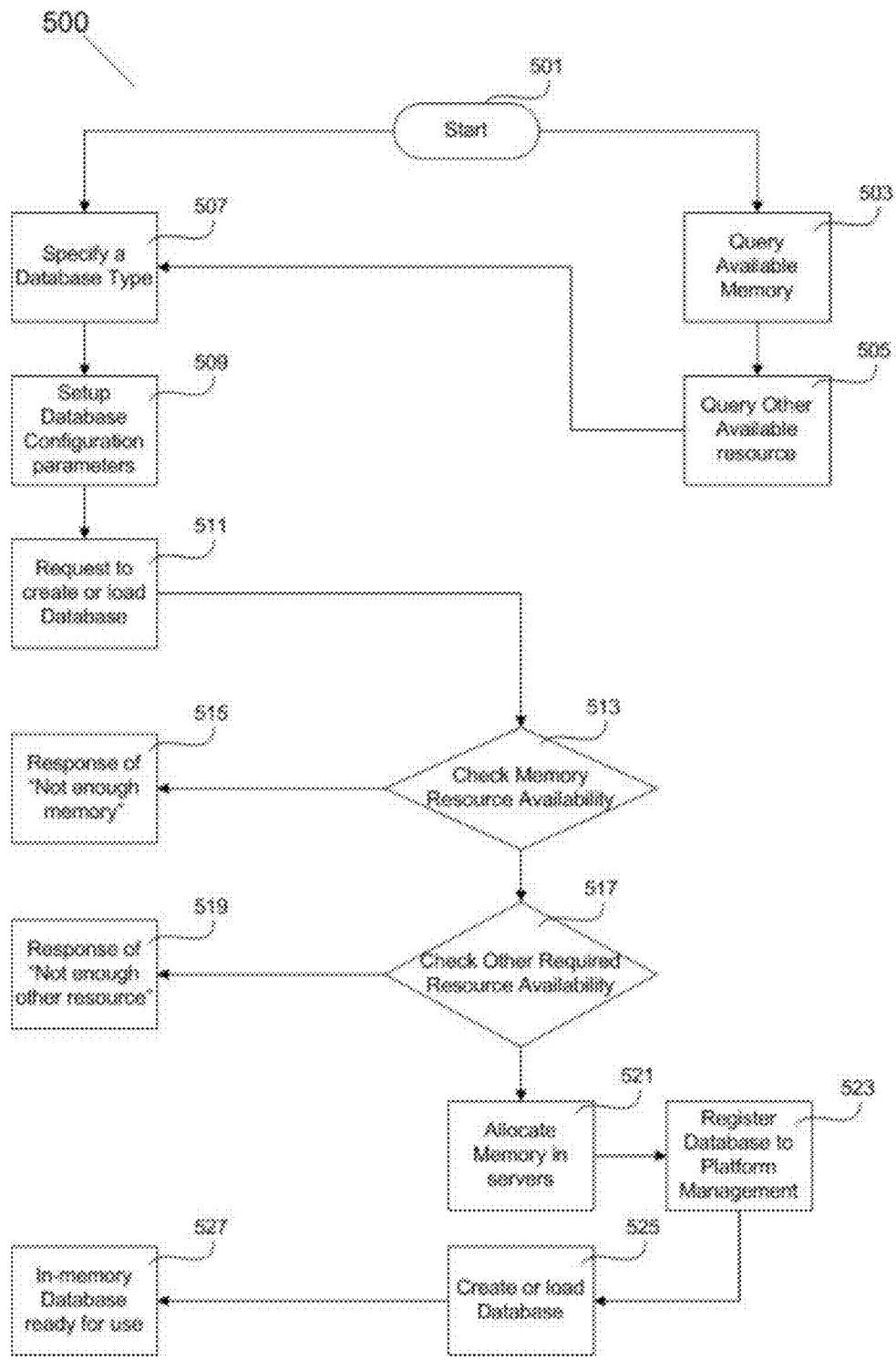
FIG. 5 illustrates a dataflow diagram of loading database or creating a database in the memory database service platform.

FIG. 5 illustrates an exemplary data flow diagram (which is straightforward and self-explainable to those who are skilled with state of the art) of loading a database into the on-demand service platform or creating a database in the service platform starting from step 501, user can start with either querying the availability of recourse 503 and 505 or let the platform automatically check the resource availability. A Database type can be a built-in one or a user-defined one which defines a collection of at least main data type, database operations, data query interfaces, and optionally security types. An example of such database type is a (built-in) Standard Relation Database which includes what standard SQL-92 (or later version of SGL) has, and SQL-92 compliant SQL query language, a set of default user access models as seen in most of current commercial relational database systems. An example of such database type is an Oracle Relational Database which may include most functions of a Standard Relational Database and some additional Oracle specific functions.

Figure 6:
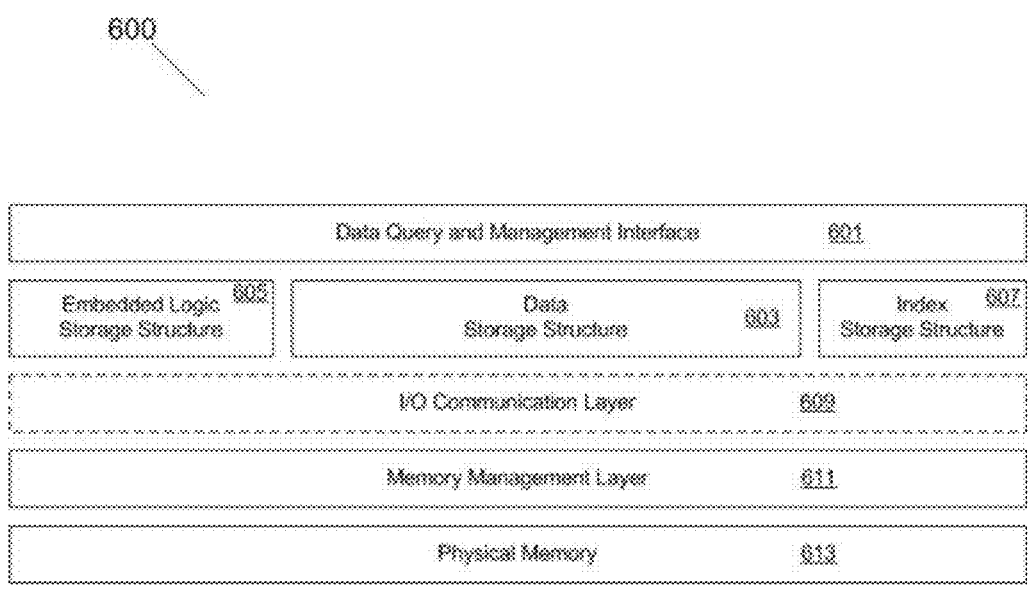
FIG. 6 illustrates a conceptual block diagram of layered database query and management system.

FIG. 6 illustrates a logical functional layer structure from a database point of view in which user access the database (from up to bottom in the diagram) through Database Query and Management Interface 601, database system includes at least data storage structure 603, index storage structure 607 and embedded logic storage structure (or logic functions) 605. An optional I/O Communication layer 609 which provides certain I/O protocol such as SCSI, or Remote DMA to access data or data storage. A memory management layer 611 provides virtual memory mapping scheme between data storage and actual physical memory 613 which may spread over one or multiple servers. The I/O communication layer 609 may be part of the memory management layer 611.

Figure 7:
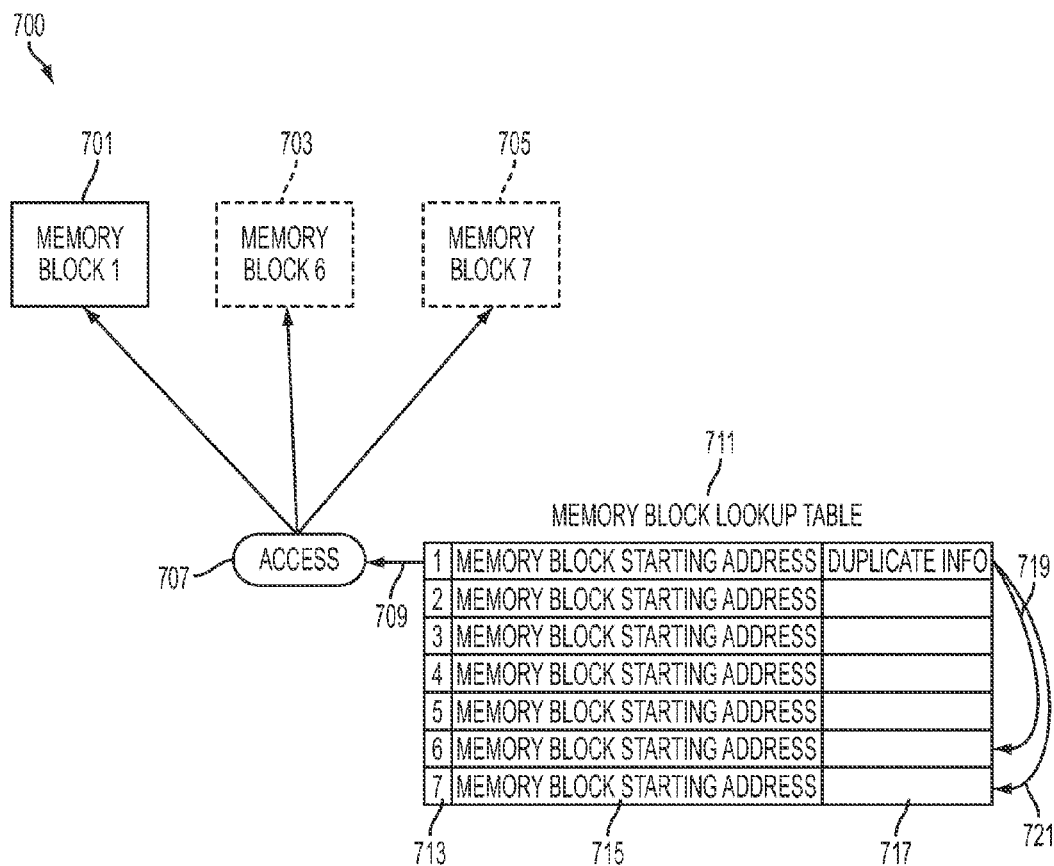
FIG. 7 illustrates a conceptual block diagram of duplicating memory blocks to off-load hot-spot memory blocks from overloaded query traffic. The duplicated memory blocks are registered and tracked. The query access to the original memory block is then distributed to the duplicated memory blocks. When query traffic is decreased to a preset threshold, the number of duplicated memory blocks can be decreased.

FIG. 7 illustrates a conceptual block diagram of an exemplary memory block replication/duplication working scenario. Memory is used to store data or is used for data manipulation. To off-load the data query traffic especially those heavy data-read traffic, one or multiple duplicate memory blocks 703, 705 can be created to off-load the heavy access traffic 707 to the original single memory block 701, redirecting some of the access traffic from original memory block 701 to its duplicated memory blocks 703 and 705. The memory blocks 703 and 705 may duplicate partial or whole content of memory block 701 depending on user or system setup. Reference to the Patent "Invariant Memory Page Pool and Implementation Thereof" and the Patent "Distributed Memory Computing Environment and Implementation Thereof" for DMCE virtual memory mapping, duplication information 719, 721 can be tracked as an exemplary embodiment in the Memory Block Lookup Table 711. The duplicated memory blocks 703 and 705 may be on different physical servers, in which case the duplication information may be included in Server ID Lookup Table (again reference to the two patents aforementioned in this paragraph). Off-loading scheduling can be Round-Robin (i.e. each memory block 701, 703 and 705 takes care of query access in turn) or other styles. The number of duplicated memory blocks can be decreased and duplicated blocks can be removed when access traffic 707 decreased or controlled by other user-defined or system-defined rules. When a duplicated memory block is removed, its associated duplication information in the Lookup Table 711 will also be removed. Note, such working scheme can be best used for memory block, but it can also be used for the situation that involves other non-volatile storage block.

Figure 8:
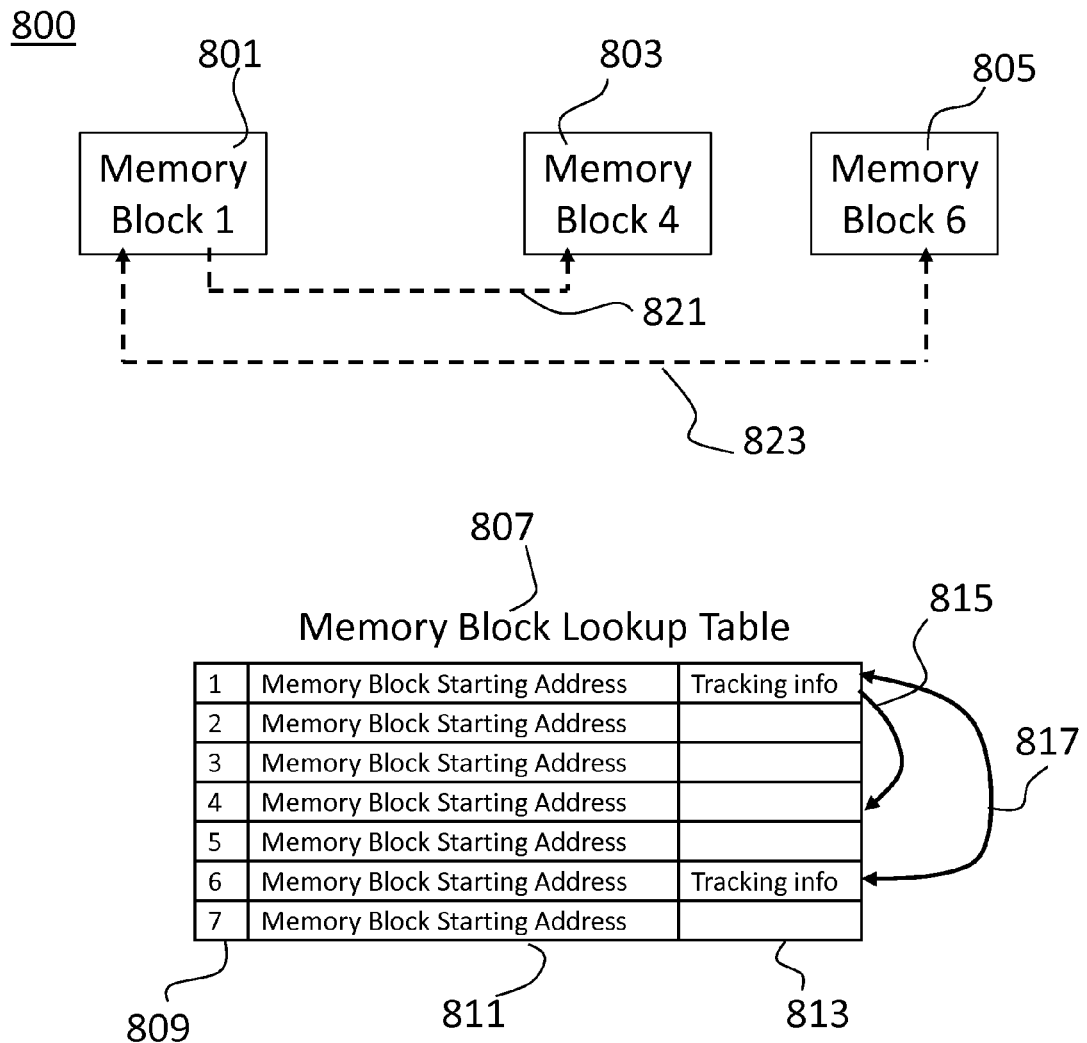
FIG. 8 illustrates a conceptual block diagram in which memory blocks are tracked with their "neighborhood" information, such neighborhood tracking can be either unidirectional or bidirectional. "Neighborhood" can be due to one block containing address pointers of another block or other user-defined "neighborhood" types.

FIG. 8 illustrates a conceptual block diagram of an exemplary memory block neighborhood working scenario. Memory is used to store data or is used for data manipulation. A memory block 803, 805 is a neighbor of another memory block 801 if the memory block 803, 805 contains a reference (such as address pointer) to the memory block 801 or the memory blocks are logically adjacent to block 801, or other user or system defined real or virtual reference to memory block 801. Such neighborhood relationship can be either unidirectional 821 (in which case block 803 is the neighbor of block 801, but block 801 is not a neighbor of block 803) or bidirectional 823 (in which case block 801 and 805 are the neighbor of each other). Referring to the Patent "Distributed Memory Computing Environment and Implementation Thereof" for DMCE virtual memory mapping, the neighborhood information may be tracked as an exemplary embodiment in the Memory Block Lookup Table 807 or other similar manor, showing bidirectional neighborhood 817 of memory block 801 and 805, and unidirectional neighborhood 815 of memory block 801 to 803. Such neighborhood information provides better logical adjacent information for data pre-fetching, data loading and other data operations. Based on the neighborhood information and required data operation, it may not necessary to load the whole database to memory for data operation such as in the present on-demand memory database service platform, but only load the neighbor blocks for related data access to avoid load unrelated data block into work space (mainly memory) for access which wastes time. Pre-fetching the neighbor blocks can make possibly related data ready (if they are not yet) for access to accelerate data access speed.

Still referring to FIG. 8 and the Patent "Distributed Memory Computing Environment and Implementation Thereof", the Patent "Invariant Memory Page Pool and Implementation Thereof", the neighborhood information makes it easier to build a more flexible block-oriented database management in which database storage is spread among multiple blocks, ideally smaller blocks. In archive mode, database blocks in a database are stored in non-volatile storage environment or other backup or secondary memory or non-memory based storage system (collectively called "secondary system"); in running mode, given a data query and based on neighborhood information, only relevant database blocks (i.e. partial portion of a database) are loaded from storage into memory for data operations. Note such neighborhood working scheme can well be used in non-volatile based database system too.

Figure 9:
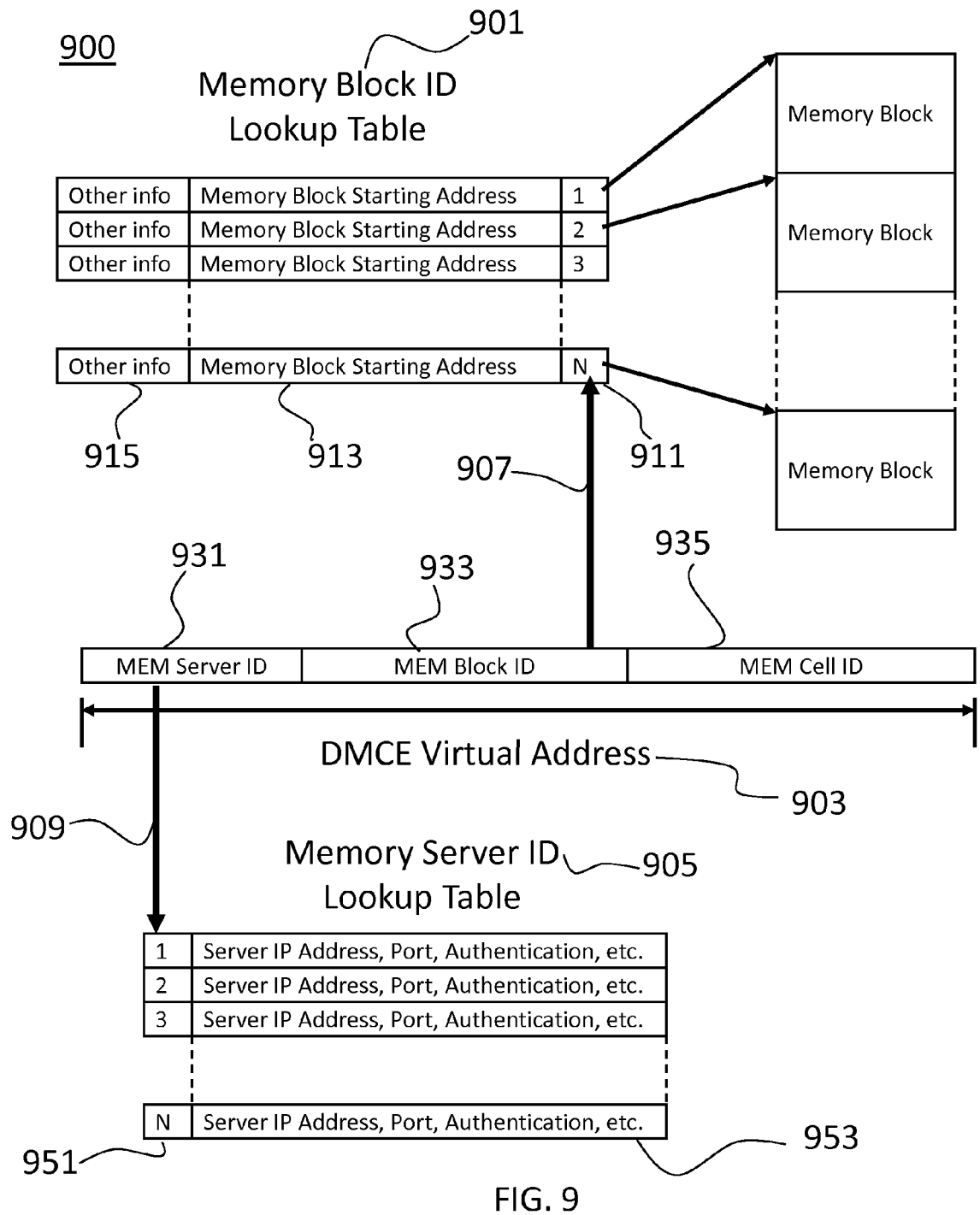
FIG. 9 illustrates a conceptual block diagram in which dynamically change of an entry in the Memory Block ID Lookup table and/or the Memory Server ID Lookup Table will effectively change the physical memory location (address) pointed to by a DMCE Virtual Address. Therefore the query to the same DMCE address that follows the entry-change in the Lookup Tables will be changed from that before.

FIG. 9 illustrates a DMCE virtual address mapping scheme which has been disclosed in the Patent "Distributed Memory Computing Environment and Implementation Thereof". Based on the two lookup tables 901 and 905, it is possible to dynamically reconfigure an actual physical location pointed to by a DMCE address 903. By changing the memory block starting address 913 of an entry in Memory Block ID Lookup Table 901, the actual physical location pointed by the DMCE address 903 will be changed from a location in a server to another location of the same server. By changing the server information 953 in an entry in the Memory Server ID Lookup Table 905, the actual physical location pointed by the DMCE address 903 will be changed from a location of a server to a similar location in a different server. Therefore, the data access to a physical location is dynamically changed to a different location after the entry change in either or both Lookup tables 901 and 905. In the Memory Block ID Lookup Table 901, it is possible for two or multiple entries to have the same memory block starting address 913 and same other information 915, therefore two or multiple entries actually points to the same physical block. Similarly in Memory Server ID Lookup Table 905, it is possible for two or multiple entries to have the same server information, therefore two or multiple entries actually points to the same server. Such features are extremely useful in the cases of system recovery, mirror and backup such that the query traffic is dynamically and transparently redirected to another blocks or different servers without shutdown data operation.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for implementing a dynamic replication in a memory or non-memory based block storage system storing data, said block storage system may include one or multiple of storage servers, comprising steps of:
    providing one or multiple replication blocks for a first block in said block storage system, and said replication blocks replicate partial or whole data of said first block; and
    redirecting an access to said first block to said replication blocks for data access;
    wherein said step of redirecting comprises the steps of:
        providing a block ID lookup table, wherein each said block has a block entry in said block ID lookup table containing a block ID, and said block entry contains direct or indirect information of a physical location of said block in said block storage system;
        providing a block address in said block ID lookup table to access to each said block, wherein said block address includes said block ID;
        dynamically duplicating data stored in a first block in said block storage system into a second block in said block storage system, wherein said first block has a first block ID in said block ID lookup table and said second block has a second block address in said block ID lookup table and wherein a first block entry in said block ID lookup table corresponding to said first block contains different direct or indirect information of a physical location of said first block than a second block entry in said block ID lookup table corresponding to said second block; and
        dynamically changing said second block address in said block ID lookup table to duplicate said first block address to re-direct said first block ID to the physical location of said second block in said block storage system;
        wherein after said dynamic change a plurality of entries in said block ID lookup table comprise said first block ID.

2. A method according claim 1 wherein a first criteria is defined in said block storage system, one or multiple said replication blocks will be created for said first block when said first criteria is met, and said accessing to said first block is to be directed to said replication blocks and said first block for data access.

3. A method according claim 2 wherein a second criteria is defined in said block storage system, the number of created said replication blocks can be decreased when said second criteria is met, and said accessing to said first block is to be directed to left-over replication blocks and said first block for data access.

4. A method according to claim 2 wherein the said creation is automatically triggered by said block storage system when said first criteria is met.

5. A method according to claim 3 wherein said decreasing is automatically triggered by said block storage system when said second criteria is met.

6. A method according to claim 1 wherein said replication blocks of said first block can be on the servers that are different from the server where said first block is located.

* * * * *